May 13, 1958
R. F. HEININGER
2,834,386
SLICING APPARATUS
Filed Sept. 26, 1955
2 Sheets-Sheet 1
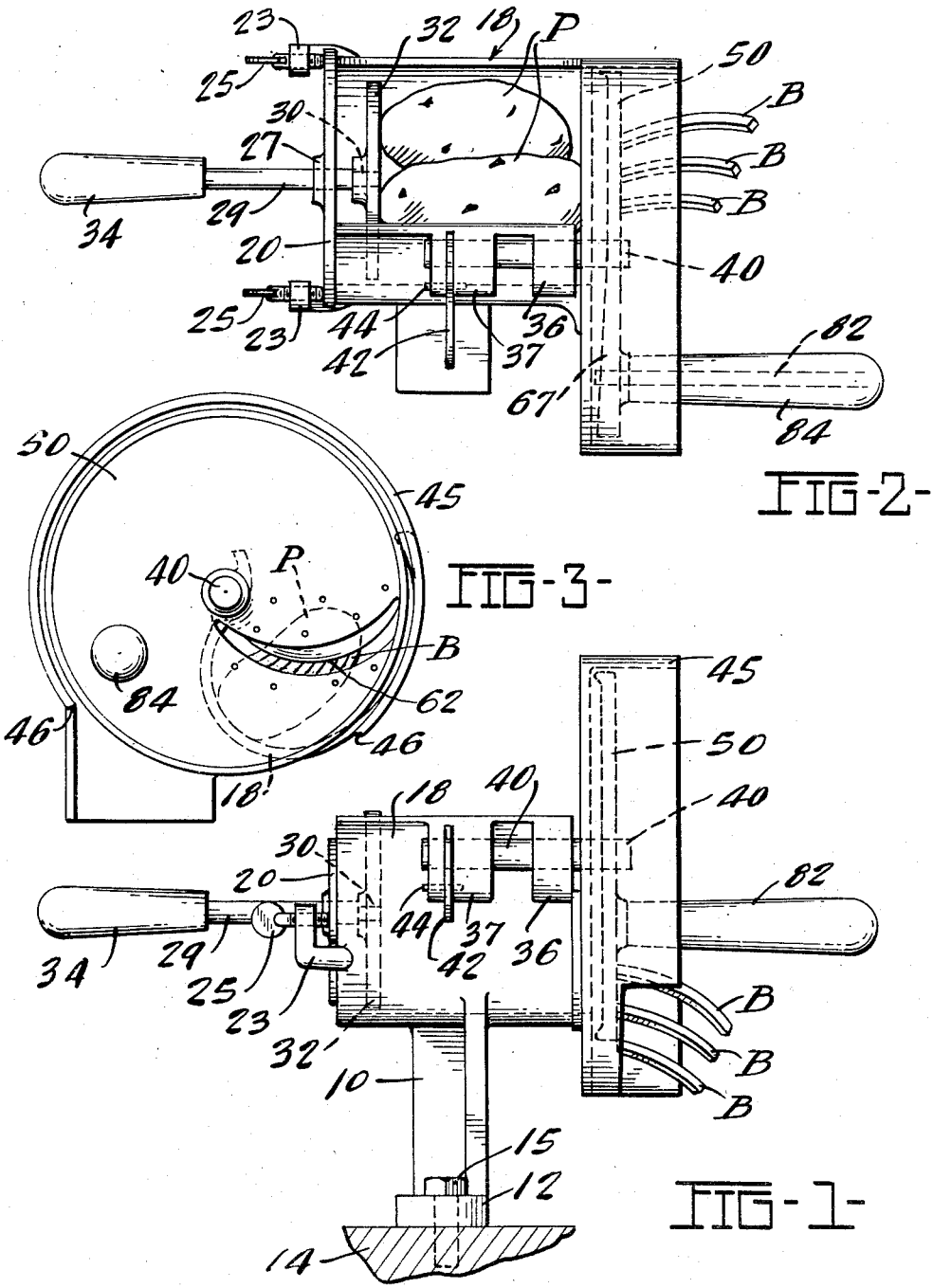
FIG-2-
FIG-3-
FIG-1-
INVENTOR:
RALPH F. HEININGER.
BY
Harry O. Ernsberger
ATTY.

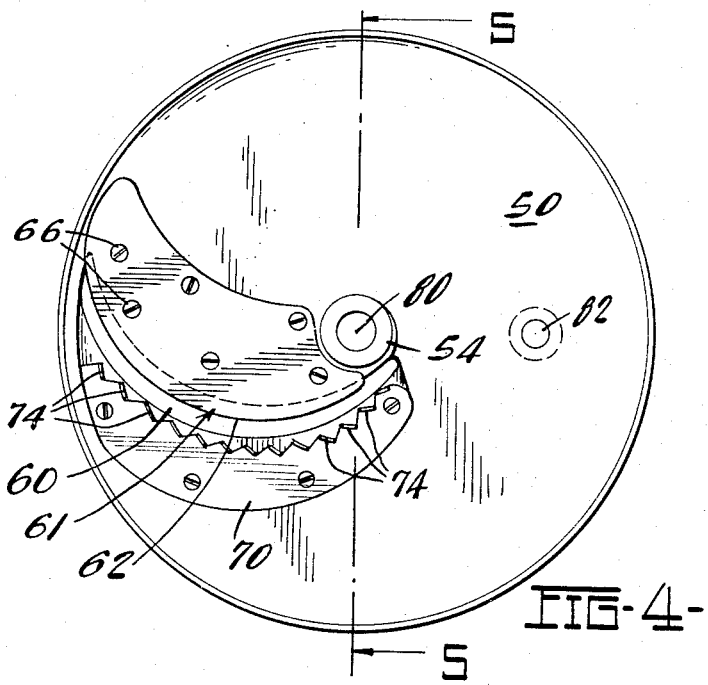
FIG-4-
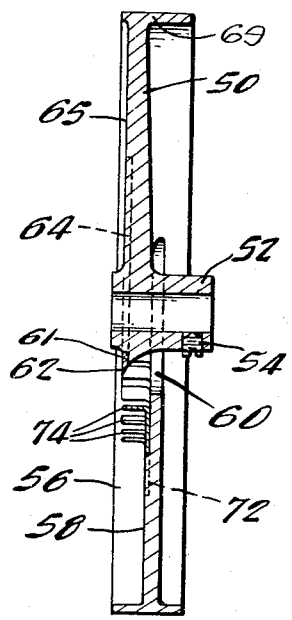
FIG-5-
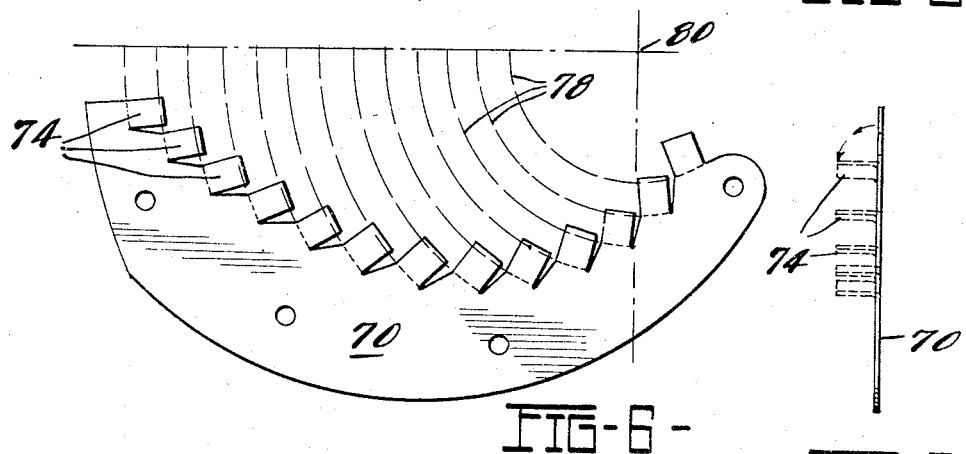
FIG-6-
FIG-7-
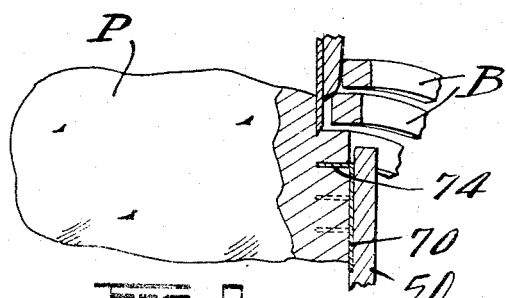
FIG-8-
INVENTOR:
RALPH F. HEININGER.
BY
Harry O. Ernsberger
ATTY.

United States Patent Office 2,834,386
Patented May 13, 1958

2,834,386

SLICING APPARATUS

Ralph F. Heininger, Toledo, Ohio

Application September 26, 1955, Serial No. 536,449

1 Claim. (Cl. 146—78)

This invention relates to a slicing apparatus or machine and more particularly to an apparatus for slicing or severing fruits and vegetables into elongated discrete portions or parts.

Devices have been proposed and used for slicing or cutting vegetables and more especially potatoes into elongated discrete fragments or parts but such devices have not been wholly satisfactory. In the use of devices heretofore utilized for the purpose, the operation of cutting or slicing is of such character that the fruit or vegetable is compressed or squeezed to the extent that the fiber is bruised and the juices lost, a condition which fosters rapid discoloration and spoilage. Furthermore, slicing devices heretofore used will not successfully slice vegetables such as onions into elongated discrete portions without crushing the vegetable.

The present invention embraces the provision of an apparatus for slicing vegetables and fruits into elongated bodies of rectangular or polygonal cross section wherein the bodies are separated by a complete cutting or severing operation without compressing, bruising or distorting the sliced or discrete portions or bodies or the remainder of unsliced vegetable or fruit.

Another object of the invention is the provision of a slicing apparatus wherein the slicing of individual bodies from a whole is accomplished by progressive severing or cutting whereby a plurality of discrete portions are separated from a vegetable or fruit during one cutting operation or cycle of the movable slicing components.

Another object of the invention is the provision of a vegetable and fruit slicing device constructed whereby the components may be quickly and easily dismantled to facilitate cleaning.

Another object is the provision of a vegetable and fruit slicing apparatus embodying a slicing or severing instrumentality which may be quickly replaced by another of different dimension whereby the size of the severed or discrete bodies may be varied depending upon the character of use or further processing of the bodies.

Another object of the invention is the provision of a slicing apparatus which is adapted for forming elongated bodies from vegetables and fruits and which is of a character adaptable for severing vegetables and fruits into separated bodies irrespective of the character of the fibrous structure of the fruit or vegetable.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view illustrating a form of slicing apparatus of the invention;

Figure 2 is a top plan view of the structure shown in Figure 1;

Figure 3 is an end view of the arrangement shown in Figure 1;

Figure 4 is an elevational view of the rotatable slicing element;

Figure 5 is a sectional view taken substantially on the line 5—5 of Figure 4;

Figure 6 is a plan view of one of the severing instrumentalities of the apparatus with the severing or cutting blades in a position prior to their formation into concentric relation;

Figure 7 is an end view of the construction shown in Figure 6, showing the method of forming the severing units or knives into severing position, and Figure 8 is a fragmentary sectional view illustrating the severing operations performed concomitantly by the severing instrumentalities of the apparatus.

The slicing apparatus of the invention is illustrated of a type adapted to be manually operated, but it is to be understood that the arrangement may be driven by a motor or other suitable means if desired.

Referring to the drawings in detail, the apparatus is inclusive of a body or supporting frame portion 10 formed at its lower end with a flange 12 which may be bolted to a support 14 such as a table or the like by means of securing bolts 15. The body 10 is formed with a hopper or receptacle portion 18 which is of generally semi-cylindrical shape. The hopper 18 is adapted to contain the vegetable or fruit to be severed or sliced into elongated discrete portions or bodies.

The rear end of the hopper 18 is adapted to be closed by a removable plate-like member 20. Cast integrally with the hopper 18 are rearwardly extending lug portions 23 preferably arranged in diametrically disposed relation as shown in Figures 1 and 2. Each lug or lug portion 23 is fashioned with a threaded bore accommodating thumb-screws or securing members 25, the ends of which are adapted to contact the closure plate 20. The thumb-screws 25 may be drawn up to securely hold the closure plate 20 to the end of the hopper or receptacle 18.

The closure plate 20 for the receptacle is formed with a boss portion 27 bored to slidably receive a rod or shaft 29. The rod 29 has a tenon portion which is pressed into or otherwise secured in an opening formed in a plate or element 32, the rod being provided with a handle or grip portion 34. The plate 32 forms an abutment or pusher for manually urging or forcing the vegetable or fruit in the receptacle into engagement with the cutting or severing instrumentalities of the apparatus.

Integrated with the receptacle 18 are aligned boss portions 36 and 37 which are bored to receive and journally support a shaft 40. The shaft 40 is formed with a transverse kerf adapted to receive a locking bar or plate 42 which is pivotally supported upon a pin 44 carried by boss portion 37. The shaft 40 may be removed longitudinally by pivotal movement of bar 42 out of engagement with the kerf in the shaft.

Secured to the receptacle or hopper 18 is a substantially circular or annular band or guard 45. Disposed within the guard is a disc-like rotor or rotatable member 50 which carries or supports the severing instrumentalities. The rotor 50 is formed with a hub portion 52 into which extends an end zone of shaft 40, the rotor 50 being held to the shaft by means of a set screw 54 or other suitable securing means. The side or surface of the element or rotor 50 adjacent the receptacle is formed with a recess 56 defined by a flat surface 58. The member 50 is formed with a generally radially extending curved slot or passage 60 through which the sliced or discrete bodies of fruits or vegetables are discharged.

The principle of operation or method of slicing involves two severing components or instrumentalities, both of which are carried by or supported upon the element or rotor 50. Secured to the element 50 is an elongated slicing or severing knife or instrumentality 61 provided with a cutting edge 62 which is of curved configuration of a generally involute shape extending substantially parallel with the slot 60 and having its inner end adjacent the hub 54 and its outer end adjacent the periphery of the rotor. The knife 61 is carried in a recess 64 formed in the face of the rotor 50. The slicing knife construction 61 is secured to the rotor 50 by means of screws 66, rivets or other suitable means.

Disposed adjacent the slicing knife 60 is a second severing instrumentality 70, the body portion of which is disposed in a recess 72 formed in the surface 58 of the rotor element 50. The cutting instrumentality 70 is formed with individual severing knives, blades or units 74 which are formed from a flat body of metal in the manner shown in Figure 6. The severing blades or knives 74 formed on the flat body shown on Figure 6 are bent or turned at right angles to the body 70 as shown in Figure 7 and are arranged in radially spaced relation with respect to the axis of the member 50.

The cutting blades or plates 74, after being bent to the configuration shown in Figures 7 and 8, are disposed for rotative movement in concentric paths indicated by the circles 78 shown in Figure 6. The leading edges of the blades 74 are ground to form cutting edges. The circles 78 indicating the paths of movement of the cutting edges of the cutting unit or blades 74 are generated about the axis 80 of the rotor 50. The severing knives or blades 74 extend longitudinally of the axis of the rotor 50 and are spaced from the center of rotation of the rotor 50 in such a pattern that the vegetable or fruit to be severed by the cutting instrumentalities or units will result in discrete elongated bodies B of the vegetable or fruit of substantially square cross section as shown in Figure 8.

The flat surface 58 of the rotor is joined with the flat surface zone 65 by an angular or tapered surface 67 so that the vegetable or fruit may be advanced by the pusher 32 to succeeding positions to be severed by the knives 62 and 74. The surfaces 58, 65, and 67 present a web encased by an integral band 69 as best seen in Figures 4 and 5.

It should be noted that the cutting or severing edges of the knives 74 are arranged in a generally curved path substantially concentric with and adjacent to the cutting edge 62 of the radially disposed slicing knife 61. The cutting knives 74 are thus arranged in a generally involute pattern adjacent the cutting edge 62 of the knife 60, and engage the material to be sliced in a zone slightly in advance of the cutting edge 62. Through this arrangement, the severing operations of the knives 74 and the knife edge 62 are carried on concomitantly to effect severing three sides of each of the bodies B as shown in Figure 8 of the vegetable or fruit at each rotation of the member 50.

The rotor 50 is provided with the shaft 82 on which is journaled a handle or grip member 84 by which the rotor and cutting instrumentalities carried thereby may be manually rotated. The walls of the guard 45 terminate as indicated at 46 providing a passage through which the severed bodies B of a vegetable or fruit are discharged at the end of each severing cycle or complete rotation of the rotor 50.

The operation of the device is as follows: Assuming for purposes of illustration that it is desired to cut or sever potatoes into elongated discrete bodies of square or rectangular cross section for the purpose of processing in deep fat, the potatoes P are placed in the receptacle or hopper 18 as exemplified in Figure 2. The operator then exerts pressure on the handle 34 in a right-hand direction as viewed in Figure 2 and concomitantly rotates the rotor carrying the cutting instrumentalities by grasping and rotating the handle 34. The abutment plate 32 through pressure on the handle 34 moves the potatoes into engagement with the adjacent face of the rotor 50, so that at each rotation of the rotor 50, the cutting instrumentalities or knives 60 and 74 sever a group of discrete bodies B from the potatoes P or other vegetable or fruit contained within the hopper 18.

By reason of the severing knives 74 being arranged in a generally involute path substantially coincident with the curvature of the cutting edge 62, the cutting edge of each severing knife 74 passes through the vegetable or fruit and severs a strip or body of uniform thickness throughout its length without compressing, squeezing or bruising the vegetable or fruit.

Through this method of slicing vegetables or fruit, the juices remain in the severed bodies B so that the liability of spoilage of the severed bodies is no greater than the liability of spoilage of the vegetable or fruit from which the bodies are severed.

The arrangement of the invention is especially adaptable for slicing onions as each severed portion of onion is not subjected to stresses or forces which would result in squeezing or extracting the natural juices from the severed portions. The same is true in severing juice bearing fruits as the juices remain in the discrete portions as they are not subjected to any forces or stresses which would cause bruises or loss of the juices.

The width and thickness of the severed portions of vegetable or fruit may be varied by using a member 70 having the severing blades or knives 74 of different spacing and employing a rotor with the knife 61 disposed at a greater or lesser distance axially of the rotor from the surface 58 thereof.

The apparatus may be automatically operated by an electric motor or other power means by connecting the shaft 40 through suitable speed reducing mechanism (not shown) with a motor or other power source. When the rotor is rotated by power means, it has been found that a speed of about 400 revolutions per minute is satisfactory.

I claim:

A slicing machine of the character disclosed, in combination, a frame, a hopper carried by said frame adapted to contain material to be sliced, a closure plate at one end of said hopper, a removable rotatable member journaled on said frame at the other end of said hopper, means for locking said rotatable member to said frame; said rotatable member comprising a web, an annular band enclosing said web and integral therewith, said web comprising two flat surfaces interconnected by an angular surface, said flat surfaces being substantially parallel to each other and to said closure plate with one of said flat surfaces spaced a closer distance to said plate than the other to provide a generally radially disposed gap in said web of involute curvature, a planar severing cutter carried on said one flat surface closest to said plate and having an involute cutting edge projecting into said gap and coextensive therewith and arranged in a plane normal to the axis of rotation of said rotatable member, an integral cutter element carried by said rotatable member on the other of said flat surfaces, said cutter element having a plurality of cutting blades located adjacent said gap and having cutting edges out of radial alignment arranged for rotation in concentric paths, said cutting edges being disposed in a curved zone substantially parallel with a wall of said gap, said concentrically spaced edges being arranged to progressively engage the material to be sliced in advance of the planar severing cutter whereby the cutting operation of the concentrically arranged cutting blades is effected in a zone in advance of the zone of severing the material by the planar severing cutter, a plate disposed in said hopper and engageable with the material in the hopper to advance the material into position to be severed by the cutter and cutter element blades, and a guard secured to said frame and substantially encasing said rotatable member.

References Cited in the file of this patent

UNITED STATES PATENTS

| 1,094,604 | Shibata | Apr. 28, 1914 |
| 1,137,017 | Ott | Apr. 27, 1915 |
| 2,715,927 | Cupper et al. | Aug. 23, 1955 |

FOREIGN PATENTS

| 215,755 | Germany | Nov. 5, 1909 |
| 410,926 | Great Britain | May 31, 1934 |
| 920,408 | Germany | Nov. 22, 1954 |